United States Patent [19]

Joanis, Jr.

[11] Patent Number: 4,725,258

[45] Date of Patent: Feb. 16, 1988

[54] MULTIPLE GROOVE VARIABLE PITCH PULLEY SYSTEM

[75] Inventor: Marvin A. Joanis, Jr., Montebello, Calif.

[73] Assignee: T & M Grinding Corp., Commerce, Calif.

[21] Appl. No.: 897,325

[22] Filed: Aug. 18, 1986

[51] Int. Cl.⁴ .............................................. F16H 9/16
[52] U.S. Cl. ......................................... 474/33; 474/34
[58] Field of Search ................................... 474/32–34, 474/39, 41, 42

[56] References Cited

U.S. PATENT DOCUMENTS

| | | | |
|---|---|---|---|
| 2,254,380 | 9/1941 | Mitchell | 474/42 |
| 2,447,958 | 8/1948 | Mueller et al. | 474/42 |
| 2,553,258 | 5/1951 | Jacobowsky | 474/33 |
| 2,555,189 | 5/1951 | Fuchslocher | 474/42 |
| 2,633,031 | 3/1953 | Browning | 474/33 |
| 2,855,787 | 10/1958 | Kumro et al. | 474/33 |
| 2,890,592 | 6/1959 | Keepers | 474/41 |
| 3,063,300 | 11/1962 | Chung | 474/33 |
| 3,108,485 | 10/1963 | Hall | 474/33 |
| 3,214,986 | 11/1965 | Anderson et al. | 474/36 |
| 3,624,716 | 11/1971 | Jaesche | 474/45 |
| 3,661,023 | 5/1972 | Maurey | 474/33 |
| 3,782,211 | 1/1974 | Campbell, Jr. et al. | 474/36 |
| 3,815,432 | 6/1974 | Maurey et al. | 474/43 |

FOREIGN PATENT DOCUMENTS 0519440  3/1940  United Kingdom ................. 474/34

Primary Examiner—Stephen J. Novosad
Assistant Examiner—Thuy M. Bui
Attorney, Agent, or Firm—Christie, Parker & Hale

[57] ABSTRACT

A multiple groove, variable pitch pulley comprises an annular hub threaded about its exterior surface. A stationary end flange is mounted at one end of the hub and a movable end flange is threaded onto the other end of the hub. One or more center flanges are threaded into the hub and lie between the stationary end flange and the movable end flange. The center flanges comprise a disk section and a collar section of lesser diameter than the disk section. The disk section of each center flange and the movable end flange each comprises an axial counterbore for receiving the collar section of an adjacent center flange.

10 Claims, 5 Drawing Figures

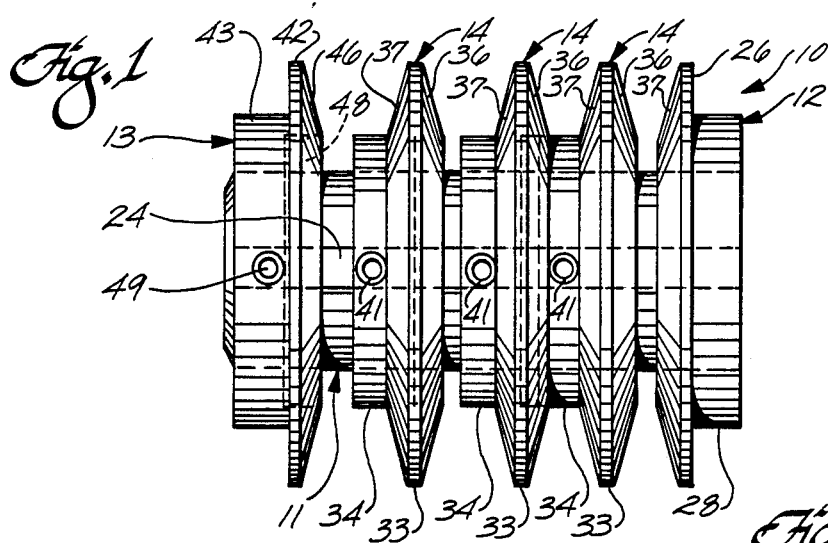
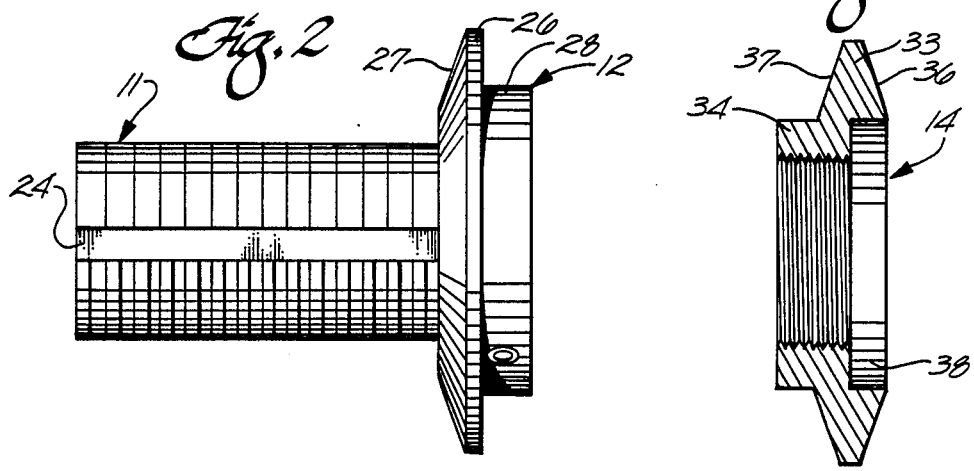
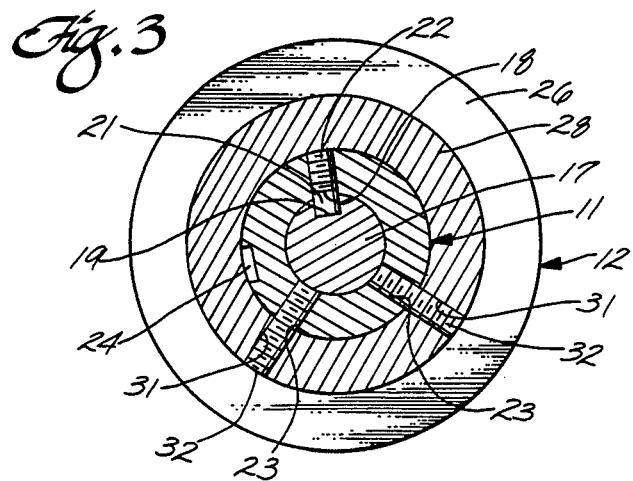

MULTIPLE GROOVE VARIABLE PITCH PULLEY SYSTEM

FIELD OF THE INVENTION

This invention relates to variable pitch pulley system and in particular to a multiple groove variable pitch pulley system.

BACKGROUND OF THE INVENTION

In numerous applications, V-belt drives are used to transmit power from the shaft of a motor to another mechanism, e.g., a fan or blower. In many of these applications, the power output level requires two or more V-belts to be used. In others, the motor is used to power two or more separate mechanisms which, in turn, requires two or more V-belts. In such situations, multiple groove pulleys are generally used. However, in some of these situations, one or more of the driven mechanisms may require a speed ratio which is not provided by a readily available multiple groove pulley of fixed pitch diameter. In those situations, multiple groove variable pitch pulleys have been suggested and used in the past.

For example, U.S. Pat. Nos. 2,633,031 to Browning, 2,855,787 to Kumro et al., 2,890,592 to Keepers and 3,661,023 to Maurey all disclose variable pitch pulleys having a single stationary center flange with an adjustable flange mounted on each side of the center flange. These pulleys are thus limited by design to two belt-receiving grooves.

U.S. Pat. No. 3,063,300 to Chung discloses a multiple groove variable pitch pulley system having a hub with two separate sets of threads. An end flange is mounted at one end of the hub and an annular center flange and sleeve are threaded onto the hub engaging the first set of threads. An annular second end flange, having a bore for receiving the sleeve of the center flange, is then threaded onto the hub, engaging the second set of threads.

U.S. Pat. Nos. 3,214,986 to Anderson et al. and 3,782,211 to Campbell et al. each discloses multiple groove, variable pitch pulleys wherein the belt-engaging grooves are formed by two sets of annular members, one set which can be moved simultaneously relative to the first set which is fixed.

The pulley systems above tend to be overly complex, difficult to adjust and/or have limited versatility. Accordingly, there is a need for a simple, yet versatile and easily adjustable multiple groove pulley system.

SUMMARY OF THE INVENTION

In accordance with the present invention there is provided a variable pitch multiple groove pulley system. The pulley system comprises an elongated, annular generally cylindrical hub fixedly attachable to the rotatable shaft of an electric motor or the like. A stationary end flange is fixedly mounted at one end of the hub. One or more movable center flanges are mounted on the hub and can be releasably secured to the hub at various locations spaced apart from the stationary end flange and from each other. A movable end flange is mounted on and releasably secured to the end of the hub remote from the stationary end flange.

The stationary end flange is generally annular and comprises a disk section having a frustoconical belt-engaging surface facing the adjacent center flange. Each center flange is generally annular and comprises a disk section and a collar section extending axially from one side of the disk section having a lesser diameter than the disk section. The disk section has a pair of oppositely facing frustoconical belt-engaging surfaces. The disk section further comprises an axial counterbore which extends into the disk section a selected depth from the side of the disk section opposite the collar section. The diameter and width of the collar section are about the same or less than the diameter and depth of the counterbore so that the collar section of one center flange can fit into the counterbore of an adjacent center flange.

The movable end flange comprises a disk section having a frustoconical belt-engaging surface facing the adjacent center flange. One of the movable end flange and stationary end flange comprises a generally cylindrical counterbore for receiving the collar section of the adjacent center flange.

In a preferred embodiment of the invention, the inner circumference of the movable end flange and center flanges and the external circumference of the hub are threaded. In this arrangement, the center flanges and movable end flange can be threaded onto the hub and moved relative to the stationary end flange and to each other by simply rotating the appropriate center or movable end flange about the hub. The center flanges and end flanges can be releasably fixed in a desired location, preferably by means of a set screw which extends through the collar sections of the center flanges and a similar collar section in the movable end flange and engage a longitudinal slot in the hub.

BRIEF DESCRIPTION OF THE DRAWINGS

These and other features and advantages of the present invention will be better understood by reference to the following detailed description when considered in conjunction with the accompanying drawings wherein:

FIG. 1 is a side view of a preferred variable pitch multiple groove pulley system;

FIG. 2 is a side view of the hub and stationary end flange;

FIG. 3 is a transverse cross-sectional view of the hub and stationary end flange of FIG. 2;

FIG. 4 is a side cross-sectional view of the center flange of FIG. 1; and

DETAILED DESCRIPTION OF THE INVENTION

Figure 5:
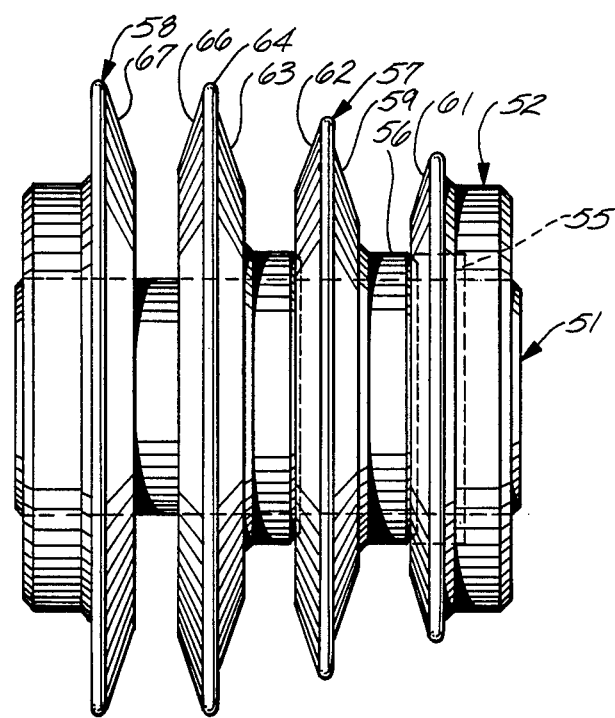
FIG. 5 is a side view of a preferred variable pitch multiple groove, multiple step pulley system.

A preferred variable pitch multiple groove pulley system constructed in accordance with the present invention is shown in FIGS. 1–4. The pulley system 10 comprises an elongated generally cylindrical hub 11 on which are mounted a stationary end flange 12, a movable end flange 13 and three generally identical center flanges 14.

The hub 11 comprises an axial bore so that the hub 11 can be mounted on the rotatable shaft 17 of an electric motor or the like. The hub 11 comprises an internal keyway 18 which extends the length of the bore of the hub 11. The keyway 18 is in the form of a channel having a generally rectangular cross-sectional configuration. When the hub 11 is mounted on a shaft 17, the keyway 18 is aligned with a corresponding keyway 19 in the shaft 17. A generally rectangular key 21 is disposed in the aligned keyways 18 and 19 and can be tightened against the shaft 17 by a set screw 22 or the like which extends through a threaded hole at one end of the hub 11. Tightening of the setscrew 22 secures the hub 11 on the shaft 17.

The hub 11 further comprises a pair of threaded holes 23 which extend through the hub and are positioned about equidistant from the set screw 22 and generally at right angles to each other.

The outer circumference of the hub 11 comprises screw threads spaced apart a selected distance, preferably to provide 16 threads per inch. A generally straight rectangular slot 24 extends the full length of the hub 11 for securing the movable end flange 13 and center flanges 14 to the hub.

The stationary end flange 12 is annular and comprises a disk section 26 having a frustoconical face about one side of its perimeter which forms a belt-engaging surface 27. A generally cylindrical annular collar section 28 extends axially from the side of the disk section opposite the belt-engaging surface 27. The inner circumference of the stationary end flange 12 is tapped to provide threads which mate with the threads of the hub 11.

A pair of threaded holes 31 are provided which extend through the collar section 28 of the stationary end flange 12 and can be aligned with the holes 23 in the hub 11. The stationary end flange 12 is secured to the hub 11 by a pair of set screws 32 which can be threaded into and extended through the holes 31 in the collar section 28 and the holes 23 in the hub 11. The set screws 32 can be tightened against the shaft 17 to further secure the hub 11 to the shaft 17.

The center flanges 14 are annular and each comprise a disk section 33 and a cylindrical collar section 34 which extends axially from one side of the disk section 33. A pair of outwardly facing frustoconical surfaces extend about the periphery of the disk section 33 and form a pair of belt-engaging surfaces 36 and 37. The inner and outer diameters of the belt-engaging surfaces 36 and 37 are about the same as those of the belt-engaging surface 27 of the stationary end flange 12.

The inner diameter of the center flange 14 is about the same as the outer diameter of the hub 11 and is tapped to provide threads which mate with the threads of the hub 11. In this arrangement, the center flange 14 can be threaded onto the hub 11, and by rotating the center flanges 14 on hub 11, they can be moved closer to or further from the stationary end flange 12 and from each other.

The disk section 33 further comprises an axial counterbore 38 which extends into the disk section from the side opposite the collar section 34. The diameter of the counterbore 38 is slightly greater than the diameter of the collar section 34. Likewise, the depth of the counterbore 38 is slightly greater than the axial width of the collar section 34. In this arrangement, the counterbore 38 of one center flange 14 can receive the collar section 34 of an adjacent center flange 14. This enables the center flanges 14 to be mounted on the hub 11 with the disk sections 33 spaced apart from each other or in face-to-face engagement.

In the embodiment shown, the center flanges 14 are mounted on the hub 11 with the collar sections 34 extending away from the stationary end flange 12. In this arrangement, the belt-engaging surface 36 of the center flange adjacent the stationary end flange 12 and the belt-engaging surface 27 of the stationary end flange form a first generally V-shaped groove for receiving a V-belt. Two additional V-shaped grooves are formed by the belt-engaging surfaces 37 of the center flanges 14 and the belt-engaging surfaces 36 of the adjacent center flanges 14.

The center flanges are secured to the hub 11 by a set screw 41 which extends through a threaded hole in the collar section 34 of the center flanges 14 and into the slot 24 in the hub 11. The setscrew 41 prevents rotational movement of the center flange 14 and the threads of the hub 11 and center flange 14 prevent lengthwise movement.

Like the center flanges 14, the movable end flange 13 is annular and comprises a disk section 42 and a collar section 43. The inner circumference of the movable end flange 13 threaded to enable the movable end flange 13 to be screwed onto the hub 11. The disk section 42 of the movable end flange 14 comprises a single frustoconical face forming a belt-engaging surface 46 which faces the adjacent center flange 14 and forms a fourth V-shaped groove with the belt-engaging surface 37 of the adjacent center flange 14.

The disk section 42 of the movable end flange 13 further comprises a counterbore 48 for receiving the collar section 34 of the adjacent center flange 14. Like the center flanges 14, the movable end flange 13 is secured to the hub 11 by a set screw 49 which extends through a hole in the collar section 43 and into the slot 24 in the hub 11.

The present invention provides the unique advantage of allowing one to quickly and easily change the number of belt receiving grooves by simply adding or removing center flanges. Moreover, the pitch diameter of each groove can be separately varied by moving the center flanges relative to the stationary end flange and to each other and by moving the movable end flange relative to its adjacent center flange.

In addition to the above, the pulley system can be converted into a variable pitch, multiple groove, and multiple step pulley system by simply changing one or more of the center flanges and/or the movable end flange. With reference to FIG. 5, the hub 51 is generally as described above. In this embodiment, the stationary end flange 52 comprises a counterbore 55 for receiving the collar section 56 of the adjacent center flange 57 rather than the movable end flange 58. The center flanges are also generally the same as described above except that the inner and outer diameter of one belt-engaging surface is larger than the inner and outer diameters of the belt-engaging surface.

In the embodiment shown, the first belt-engaging surface 59 of the first center flange 57, which forms a first V-shaped groove with the belt-engaging surface 61 of the stationary end flange 52, has about the same inner and outer diameter as that belt-engaging surface 61. However, the second belt-engaging surface 61 of the center flange 57, which faces away from the stationary end flange 52, has greater inner and outer diameter than that of the first belt-engaging surface 59.

The first belt-engaging surface 63 of the second center flange 64, which forms a second V-shaped groove with the second belt-engaging surface 67 of the first center flange 57, has about the same inner and outer diameter as that second belt-engaging surface 62. The second belt-engaging surface 66 of the second center flange 64 has a greater inner and outer diameter than that of the belt-engaging surface 63 of that second center flange 64.

Finally, the belt-engaging surface 67 of the movable end flange 58, which forms a third V-shaped groove with the second belt-engaging surface 66 of the second center flange 64, has about the same inner and outer diameter as that second belt-engaging surface 66.

The unique advantage of this design is that different pitch diameters can be selected for each step of the pulley system and each of those pitch diameters can be independently adjusted for fine tuning each such step. Such a pulley system offers tremendous versatility in arriving at properly adjusted pitch diameters for multiple groove pulley systems.

In the embodiment above, the pitch diameter steps up twice. That is, the pitch diameter of the second V-shaped groove is larger than that of the first V-shaped groove and the pitch diameter of the third V-shaped groove is larger than that of the second. It is apparent that a pulley system in which the pitch diameter of adjacent V-shaped grooves steps down or one that combines upward and downward steps may be utilized as desired.

The preceding description has been presented with reference to the present preferred embodiments of the invention shown in the accompanying drawings. Workers skilled in the art and technology to which this invention pertains will appreciate that alterations and changes in the described apparatus and structures can be practiced without meaningfully departing from the principle spirit and scope of the invention.

For example, it is apparent that any method for fixedly attaching the stationary end flange to the hub may be used. In fact, if desired, the stationary end flange and hub may be molded as an integral unit.

It is also understood that any size threads may be used on the hub and the various flanges. The center flange and movable end flange have been described as having a single set screw which engages the slot in the hub. This means that the center flanges and movable end flange can be moved lengthwise only in steps corresponding to the distance traveled as a result of one full rotation of the center flanges or movable end flange about the hub, e.g., multiples of 1/16 inch. It is apparent, however, that additional set screws can be incorporated into the collar sections of the center flange and movable end flanges so that the center flanges and movable end flange can be moved and fixed a distance corresponding to fractions of a revolution. Alternatively, the hub may comprise more than one groove for engaging the setscrew.

Accordingly, the foregoing description should not be read as pertaining only to the precise structures and procedures described, but rather should be read consistent with and as support for the following claims which are to have their fullest fair scope.

What is claimed is:

1. A variable pitch multiple groove pulley system comprising:
    an annular generally cylindrical hub mountable on a cylindrical shaft said hub comprising external threads;
    an annular, stationary end flange fixedly mounted at one end of the hub comprising a frustoconical belt-engaging surface;
    an internally threaded annular movable end flange threaded onto the hub and releasably secured to the hub at a position spaced apart from the stationary end flange, said movable end flange comprising a disk section having a frustoconical belt-engaging surface facing the belt-engaging surface of the stationary end flange;
    at least one internally threaded annular movable center flange threaded onto the hub and releasably secured to the hub at a position between the stationary end flange and the movable end flange, said center flange comprising a disk section and a cylindrical collar section extending axially from one side of the disk section, said disk section having first frustoconical belt-engaging surface facing the stationary end flange and second frustoconical belt-engaging surface facing the movable end flange and counterbore having a diameter at least as great as the diameter of the collar section extending into the disk section from the side of the disk section opposite the collar section for receiving the collar section of an adjacent center flange; and
    wherein one of the stationary end flange and movable end flange comprises a counterbore having a diameter at least as great as the diameter of collar section of the center flange for receiving the collar section of an adjacent center flange.

2. A variable pitch multiple groove pulley system as claimed in claim 1 wherein the hub comprises an external longitudinal slot and each center flange is releasably secured to the hub by a setscrew which extends radially through the collar section of the center flange into the slot.

3. A variable pitch multiple groove pulley system as claimed in claim 2 wherein the movable end flange comprises a cylindrical annular collar section which extends axially from the side of the disk section of the movable end flange remote from the center flange and wherein the movable end flange is releasably secured to the hub by a setscrew which extends radially through the collar section of the movable end flange into the slot.

4. A variable pitch multiple groove pulley system as claimed in claim 1 wherein the pulley system comprises at least two center flanges.

5. A variable pitch multiple groove pulley system as claimed in claim 1 wherein the inner and outer diameters of the belt-engaging surfaces of the stationary end flange, movable end flange and each center flange are all generally the same.

6. A variable pitch multiple groove pulley system as claimed in claim 1 wherein the inner and outer diameters of each pair of belt-engaging surfaces which form a belt-receiving V-shaped groove are generally the same.

7. A variable multiple groove pulley system as claimed in claim 7 wherein the inner and outer diameters of the first belt-engaging surface of a center flange are different from the inner and outer diameters of the second belt-engaging surface of that center flange.

8. A variable pitch multiple groove pulley system comprising:
    a generally cylindrical, externally threaded hub mountable on a cylindrical shaft;
    an annular, stationary end flange fixedly mounted at one end of the hub comprising a disk section having a frustoconical belt-engaging surface;
    at least one first annular, internally threaded, movable center flange threaded onto the hub and releasably secured to the hub at a position adjacent the stationary end flange, said first center flange comprising a disk section and a cylindrical collar section extending axially from one side of the disk section, said disk section having a first frustoconical belt-engaging surface facing and forming a first belt-receiving groove with the belt-engaging surface of the stationary end flange and having about the same inner and outer diameter as the belt-engaging surface of the stationary end flange and a second frustoconical belt-engaging surface facing away from the stationary end flange and having select inner and outer diameters, said disk section further comprising a counterbore extending into the disk section from the side opposite the collar section having a diameter at least as great as the diameter of the collar section;

a second annular, internally threaded, movable center flange threaded onto the hub and releasably secured to the hub at a position adjacent the first center flange, said center flange comprising a disk section and a cylindrical collar section extending axially from one side of the disk section, said disk section having a first frustoconical belt-engaging surface facing and forming a second belt-receiving groove with the second belt-engaging surface of the first center flange and having about the same inner and outer diameter as the second belt-engaging surface of the first center flange, and a second frustoconical belt-engaging surface facing away from the first center flange and having select inner and outer diameters and a counterbore extending into the disk section from the side opposite the collar section having a diameter at least as great as the diameter of the collar section;

an annular, internally threaded, movable end flange threaded onto and releasably secured to the end of the hub remote from the stationary end flange comprising a disk section having a frustoconical belt-engaging surface facing and forming a third belt-receiving groove with the second belt-engaging surface of the second center flange adjacent the movable end flange and having about the same inner and outer diameter as that of the second belt-engaging surface of that second center flange; and wherein one of the stationary end flange and movable end flange comprises a counterbore having a diameter at least as great as the diameter of collar section of the center flange for receiving the collar section of an adjacent center flange.

9. A variable pitch multiple groove pulley system as claimed in claim 8 wherein the inner and outer diameters of the second belt-engaging surface of the first center flange are different than the inner and outer diameter of the first belt-engaging surface of the first center flange.

10. A variable pitch multiple groove pulley system as claimed in claim 8 wherein the inner and outer diameter of the second belt-engaging surface of the second outer flange are different from the inner and outer diameter of the first belt-engaging surface of the second center flange.

* * * * *

UNITED STATES PATENT AND TRADEMARK OFFICE
CERTIFICATE OF CORRECTION

PATENT NO. : 4,725,258

DATED : February 16, 1988

INVENTOR(S) : Marvin A. Joanis, Jr.

It is certified that error appears in the above-identified patent and that said Letters Patent is hereby corrected as shown below:

In the Specification:

Column 4, Line 16    After "flange" change "14" to -- 13 --

Column 4, Line 48    Before "belt-engaging" insert -- other --

Column 4, Line 56    After "has" insert -- a --

In the Claims:

Column 6, Lines 9, 10    Change "beltengaging" to -- belt-engaging --

Column 6, Line 49    Change "claim 7" to -- claim 6 --

Signed and Sealed this

Eighteenth Day of October, 1988

Attest:

DONALD J. QUIGG

*Attesting Officer*    *Commissioner of Patents and Trademarks*